United States Patent [19]

Feldmann

[11] Patent Number: 4,677,857

[45] Date of Patent: Jul. 7, 1987

[54] FASTENER ARRANGEMENT FOR DEFORMATION SENSOR

[75] Inventor: Joachim Feldmann, Neustadt, Fed. Rep. of Germany

[73] Assignee: WABCO Westinghouse Fahrzeugbremsen GmbH, Hanover, Fed. Rep. of Germany

[21] Appl. No.: 791,674

[22] Filed: Oct. 28, 1985

[30] Foreign Application Priority Data

Nov. 10, 1984 [DE] Fed. Rep. of Germany ....... 3441127
Jun. 28, 1985 [DE] Fed. Rep. of Germany ....... 3523168

[51] Int. Cl.⁴ .......................... G01L 1/26; F16B 29/00
[52] U.S. Cl. ..................................... 73/855; 403/24; 403/282
[58] Field of Search ............... 73/855, 781, 782, 760; 33/147 D, 148 D; 403/24, 279, 274, 282

[56] References Cited

U.S. PATENT DOCUMENTS 3,411,348 11/1968 Schultheis, Jr. .
4,023,402 5/1977 Watanabe .............................. 73/855
4,064,744 12/1977 Kistler ............................... 73/781 X
4,553,872 11/1985 Chandra et al. ................... 73/855 X

FOREIGN PATENT DOCUMENTS 1861770  5/1962  Fed. Rep. of Germany .
1255393 11/1967  Fed. Rep. of Germany .
1400924 10/1971  Fed. Rep. of Germany .
2207820  8/1972  Fed. Rep. of Germany .
1472587  5/1977  Fed. Rep. of Germany .
7737338  4/1978  Fed. Rep. of Germany .

*Primary Examiner*—Charles A. Ruehl
*Attorney, Agent, or Firm*—G. J. Falce

[57] ABSTRACT

A fastener arrangement for clamping a sensor element to a member whose deformation is to be monitored so as to eliminate signal distortions due to the clamping process and to settling phenomena. The sensor element is formed at its contact point with the member to be monitored by pressing between a die and counter-die as the clamping screws are tightened to provide a form-fit closure of the sensor element with the member to be monitored. The die and counter-die are formed on the adjacent surfaces of the member to be monitored and a torsion member; between which surfaces, the sensor element lies. The screw support member can be arranged to isolate the screw turning moments from the sensor element jointly with the form-fit closure feature.

24 Claims, 5 Drawing Figures

FASTENER ARRANGEMENT FOR DEFORMATION SENSOR

BACKGROUND OF THE INVENTION

The invention relates to an apparatus for the fastening of a sensor element to a deformable member, such as, a vehicle axle, in order to monitor the axle deflection as an indication of the load condition of the vehicle.

Such an apparatus is known from the publication of the VDO Vertriebsgesellschaft mbH, Bad Soden, "Loading Weight Scale, Axle-Load Scale", particularly page 11. It describes how a sensor support of a deformation sensor, calibrated as a transmitter for axle loads, is fastened to a second component, such as, an axle housing, by means of one cap screw each at the screw-down points.

On the known apparatus, the screw heads of the cap screws are in direct contact during the tightening and, thereafter, with the screw-down points of the sensor support. As a result of the friction forces produced during the tightening of the cap screws at the screw-down points of the sensor support by the screw heads, the torqrue on the screw heads is transferred to the sensor support, which is essentially deformed in an "S"-shape. The deformation sensor detects this deformation as a background deformation and delivers a corresponding background electrical signal.

If the apparatus has been improperly installed or assembled, this background signal can occupy a significant portion of the operating range of the deformation sensor, so that its remaining operating range for the detection of the actual operational deformations is either insufficient or the sensor signals suffer a decline in precision. As a result of settling phenomena (specifically under the influence of dynamic load changes), there can be a reformation of the background deformation, which can result in a change in the background signal, and thus imprecise measurements or increased measurement imprecision.

On the apparatus described, the deformation sensor is positively connected with the second component (axle housing) to monitor its deformation, as an indication of the load condition. This connection can be distorted by the above-mentioned dynamic load changes, which can result in additional measurement imprecision.

It is conceivable that the disadvantages of the apparatus, described above, could be overcome to, welding the sensor support with the second component. The residual stresses caused by the welding, however, also cause a background signal, which can, if the appratus has been improperly installed or assembled, occupy an unacceptable large portion of the operating range of the deformation sensor. Another disadvantage is that the residual stresses decrease over time, especially with dynamic load changes, which can lead to imprecise measurements or increased measurement imprecision. The welding may also cause problems when a safety-related part, such as, an axle housing, is involved, on account of the residual stresses. Finally, the welding has the further disadvantage that replacing the deformation sensor is time consuming and difficult.

A first component, in the form of a sensor, can also be connected (in the manner described above) with two second components, whose displacements, in relation to one another, it monitors. In this case, too, the above-mentioned disadvantages caused by the attachment apparatus can be expected.

In other cases, e. g., with a tool-holder as the first component and a machine tool bed as the second component, it is necessary for the mutual position of the components to be permanently fixed, even under the action of dynamic influences. This problem, too, cannot be overcome with an apparatus of the type described above.

SUMMARY OF THE INVENTION

The object of the present invention is to improve an apparatus (of the type described above) by simple means, so that it guarantees a connection or a secure fixing of position, largely free of background deformation, between a first and second component or second components; a connection which is also free of settling phenomena and which does not change under the influence of dynamic load changes.

Briefly, this objective is achieved (in accordance with the present invention) by isolating the first component from the clamping torque of the cap screw, by creating a form-closed connection between the first and the second component, and by realizing both characteristics jointly in the manufacture of the connection.

The form closure can be used particularly to fix the first component in a preferred direction, specifically of a measurement apparatus, but also to fix it in all other directions.

The invention can be realized by placing the screw-down points and corresponding contact areas of the first component next to one another or eccentric to one another, and thus also the cap screw and embossing-die configuration of the torsion member and the second component next to one another or eccentric to one another.

When the cap screws and contact area are next to one another or eccentric to one another, they can be oriented with respect to one another so that the cap screw must run through the first component or can lie outside the first component. In the latter case, the first component can be penetrated at the contact point with the possibility of a separation (slit) or can be solid. An interrupted contact point improves the deformability and/or the stress relief; a solid contact point, where possible, costs less to manufacture.

A particularly significant reduction of the background deformation of the first component can be achieved by splitting the contact regions. In this configuration, the contact regions can be particularly easily deformed by stamping.

If the first and the second components are connected by two cap screws, then the contact region separation can run essentially in the direction of the connecting line of the centers of the screw-down points. In this configuration, the deformation of the clamped areas, by the configuration of the torsion member and the second component in the manner of an embossing die, runs almost completely transverse to the above-mentioned connecting line and, therefore, in a direction which is harmless from the point of view of background deformation.

The invention can be advantageously and economically realized, since the embossing-die configuration of the torsion member and the second component can consist of easily-manufactured geometric shapes, and the center-to-center distance of the screw-down points of the first component (on the one hand) and the centerto-center distance of the screw holes in the second component (on the other hand) as well as the screw hole or holes in the first component, can be made with large tolerances. For this reason, the screw hole or holes (including any recesses in the configuration of the embossed contours) can be made without a drill, which means that it is also possible to advantageously perform a retrofitting operation. It is also particularly easy to replace the first component.

It will be apparent to a specialist in the field that the invention can be advantageously applied (in all cases) where it is a question of measuring deformations of a component or displacements of two components, in relation to one another, in the measurement direction of a deformation sensor. Examples include expansion measurements on test rods in fatigue tests, or the monitoring of the distances between rods in steel structures. As long as the stresses which cause the deformations or displacements of the component or components are active in the elastic range, the preferably electrical output signal of the deformation sensor can be calibrated in stress, force, bending moment or torque units, or similar units.

In a preferred embodiment, the invention is realized with a deformation sensor; whose sensor support, as the first component, consists of sheet metal. The first component, however, can also be designed in any other suitable manner, as long as it is soft enough for deformation by punching only in the area of the contact surfaces, either by selection of the material or by design configuration.

The sensor support, as the first component, can exhibit flat surfaces before installation in the contact areas; but it can also be configured in any desired manner on the above-mentioned surfaces. For example, it can have predeformations on the above-mentioned surfaces which facilitate handling during installation, e. g., by means of manipulators.

The deformation sensor can be a component of a measurement system, which consists of several sensors.

A particularly economical overall configuration can be achieved if the torsion member or substrate is simultaneously designed as a cover hood for the first component.

The torsional support of the screw support can be manufactured simply by making the screw support, in the region where it contacts the second component, a surface complementary to it. For example, when the second component has a convex surface, such as that represented by an axle housing, the torsion member are in contact with a complementary, concave contact region on the second component, and thereby are torsion-proof in relation to the latter.

There are further economical configuration possibilities, if the torsion member is formed as a first support part which is torsionally fixed in relation to the second component, and a second support part exhibiting an area designed as a die or a counter-die, in which case the former can be designed as a cover for the first component and the latter as a thrust piece.

The invention is explained below on the basis of embodiments which are illustrated in the drawings, whereby parts with the same functions are identified with the same reference numbers in all drawings.

BRIEF DESCRIPTION OF THE DRAWINGS

These and other objects and advantages of the invention will be more fully explained with reference to the accompanying drawings, in which.

DESCRIPTION AND OPERATION

Figure 1:
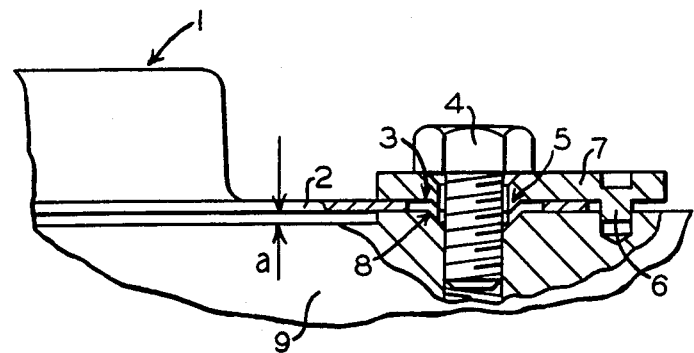
FIG. 1 shows one configuration of a deformation sensor on an axle housing.

FIG. 1 shows a deformation sensor 1, which is connected to measure the load of a deformable component by means of screw connections with the component, whereby the deformable component consists of the axle housing 9. By means of the position and direction of the deformation sensor 1 on the axle housing 9, the load deflection of the axle housing 9 and the direction of its monitored deformation and stress are determined. When the deformation sensor 1 is configured with vertically-oriented screw connections, the deformation sensor can be used, for example, to measure the current axle load.

Figure 2:
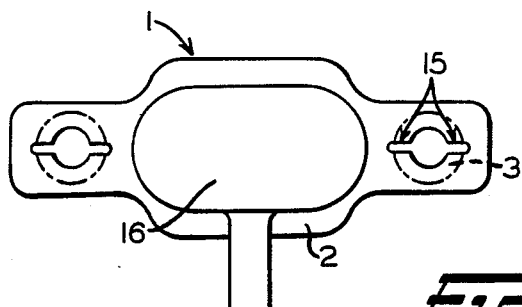
FIG. 2 shows an overhead view of the deformation sensor shown in FIG. 1, prior to its clamping to the axle housing.

The deformation sensor 1 exhibits a sensor support 2, preferably made of sheet metal, which serves as the first component in which (as shown in FIG. 2) there is a measurement element 16 with electrical feeds. The sensor support 2 exhibits, on opposite sides of the measurement element 16, a punched screw hole (only one of which is shown). A surface region of the sensor support 2, concentric to each screw hole, serves as the screw-down point, which is also designed as the contact area. The overall designation for each of these areas is "contact area 3".

The sensor support 2 is fastened to the axle housing 9, at each of the contact areas 3, by means of cap screws 4 (only one of which is shown). The details of this fastening are shown in cross-section in the right-hand portion of FIG. 1, and also correspond to the left side (which is not shown). The sensor support 2 is connected by means of a cap screw 4, which penetrates its screw hole in the axle housing 9. The sensor support 2 is thereby in contact with the underside of its contact area 3 on a contact surface, starting from which, a threaded hole to accept the thread of the cap screw 4 penetrates into the axle housing 9. At the transition, from the threaded hole to the contact surface, the axle housing 9 exhibits a conical depression 8 concentric to the threaded hole.

Between the upper side of the contact area 3 of the sensor support 2 and the screw head of the cap screw 4, there is a torsion member 7, which also exhibits a screw hole which is penetrated by the cap screw 4.

The axle housing 9, in addition to the screw hole, exhibits another hole. Penetrating into this hole is a centering button 6 that projects from the underside of torsion member 7. The torsion member 7 is thereby connected to the axle housing 9 without rotation relative thereto. For a torsion connection, the axle housing 9 and the screw support can be connected together by means of a pin (not shown).

Concentric to the screw hole, the torsion member 7 exhibits (on its upper side) a conical depression produced by a stamping process. The material impressed on the upper side of the torsion member 7 has accumulated on the bottom side of the torsion member 7 opposite the contact area 3 of the sensor support 2, and forms a circular lip concentric to the screw hole in the torsion member 7, which is complementary to the conical recess 8 in the axle housing 9. On account of the described configuration of the conical depression 8 and the conical lip 5, the torsion member 7 forms a die and the axle housing 9 a counter-die, in the manner of an embossing die. When the cap screw 4 is tightened, the sensor housing 2, held between the torsion member 7 and the axle housing 9, is deformed in its contact area 3 (according to the complementary contours of the die and counter-die) so that the sensor housing 2, after the tightening of the cap screw 4, exhibits a conical collar, by means of which it penetrates into the conical recess 8 of the axle housing 9.

The deformation sensor 1 (in the present case) has the task of measuring length changes of the axle housing 9 in the direction of the line connecting the centers of the screw-down points, and of supplying electrical signals, as a function of these changes, to an evaluation apparatus, in which they are processed as load signals. In the present case, therefore, the line connecting the centers of the screw-down points defines a measurement direction of the deformation sensor 1.

As shown in FIG. 2, the contact area 3 is divided on each side of the sensor support 2 (starting from the screw hole in question) by slits 15 essentially oriented in the measurement direction. The above-described deformation of the contact area 3 of the sensor support 2 is therefore reduced when the cap screw 4 is tightened, primarily transverse to the measurement direction, with the result that the background deformation of the axle load sensor is effectively reduced.

It is apparent that the background deformation is greatly reduced by the above-mentioned division of contact area 3 by slits 15, even when the deformation sensor is configured with measurement directions outside the above-mentioned connecting line.

In addition to the fastening arrangement described above, the sensor support 2 and the axle housing 9 are separated from one another by a distance "a", intermediate the sensor contact points, so that no friction forces can occur between the sensor support 2 and the axle housing 9, which might influence the measurement results.

The above-mentioned fixed torsional connection of the torsion member 7 to the axle housing 9 prevents friction forces, corresponding to the screw turning moments, from being introduced into the sensor support 2 when the cap screw 4 is being tightened in the direction of rotation of the cap screw, whereby the origin of a background deformation is minimized. As a result of the penetration of the circular collar, formed during the tightening of the cap screw 4 on the sensor support 2 into the conical recess 8 of the axle housing 9; a form-fit connection is achieved between the sensor support 2 and the axle housing 9, which exhibits no settling phenomena or drift tendencies during use.

The recess in the axle housing can also be cylindrical or spherical (in a manner not illustrated), in which case, the surrounding lip in the bottom of the torsion member 7 can also be designed with a complementary shape. If the lip and the recess in the axle housing are cylindrical, the collar—formed on the sensor housing—is also cylindrical.

Figure 3:
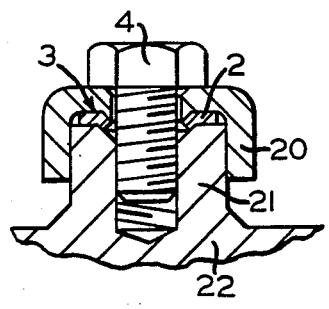
FIG. 3 shows another configuration of the deformation sensor.

FIG. 3 shows another embodiment of a fastening of the deformation sensor 1 to an axle housing (identified in this case as 22). In this case, the axle housing 22 exhibits an upraised support stud 21.

The explanations given in the description of the embodiment (illustrated in FIGS. 1 and 2) also apply to the embodiment (illustrated in FIG. 3), with the exception of the configuration of the torsion member, identified here as 20. The torsion member 20 exhibits a pair of arms, which are bent-over into contact with the lateral surfaces of the support stud 21, to provide the torsion bearing for the bent-over arms of torsion member 20 on the axle housing 22.

It is apparent that, if in this embodiment, the residual stresses which occur do not lead to an unbearably high background deformation of the deformation sensor 1, the support stud 21 can be welded onto the axle housing 22. The embodiments described above can be economically manufactured. On one hand, the sensor support 2 can be manufactured with large tolerances with regard to the distance between the screw holes, since the centering and attachment of the deformation sensor 1 takes place when the screw connection is being made. On the other hand, the configuration of the torsion member 7 or 20 and the axle housing 9 or 22 requires no additional work processes, since the latter can be combined with other processes in the production of the threaded hole in the axle housing 9 or 22. In the case of the embodiment (illustrated in FIG. 3), the down-turning of the sides of the torsion member 20 can also be combined with the punching and stamping process.

Figure 4:
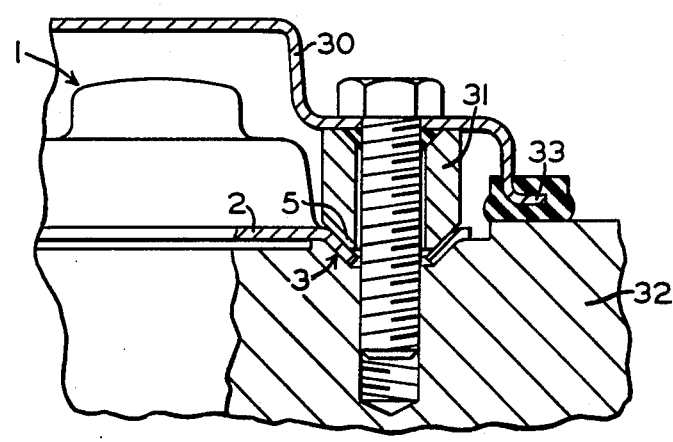
FIGS. 4 and 5 show configurations similar to FIG. 1, but with a screw support member formed from two separate pieces.

FIG. 4 shows another embodiment for a fastening of the deformation sensor 1 to an axle housing (identified in this case as 32). The torsion member 30, 31 (in this case) is in separate pieces and consists of a first support part designed as a cover hood 30 of the deformation sensor 1 and thus of the sensor support 2, and a second support part designed as a thrust piece 31. The thrust piece 31 is concentric to the cap screw between the cover hood 30 and the deformation sensor 2, and has a surrounding lip 5 on its end toward the sensor housing 2. In its spatial expansion in front of and behind the plane of the drawing, the axle housing 32 exhibits a convex surface which is essentially cylindrical. On its outer boundary, the hood 30 exhibits a surrounding flange 33, which follows the convex surface of the axle housing 32 and forms a concave contact area with the screw support 30, 31 complementary to it. As a result of the complementary surface configuration, the hood 30 is torsionally connected with the axle housing 32. By means of a surrounding seal pulled over the flange (and not described in any further detail), the space enclosed between the cover hood 30 and the axle body 32, containing the deformation sensor 1, need not be sealed from the outside. The same purpose is served by a gasket (also not described in any further detail) between the hood 30 and the thrust piece 31.

Figure 5:
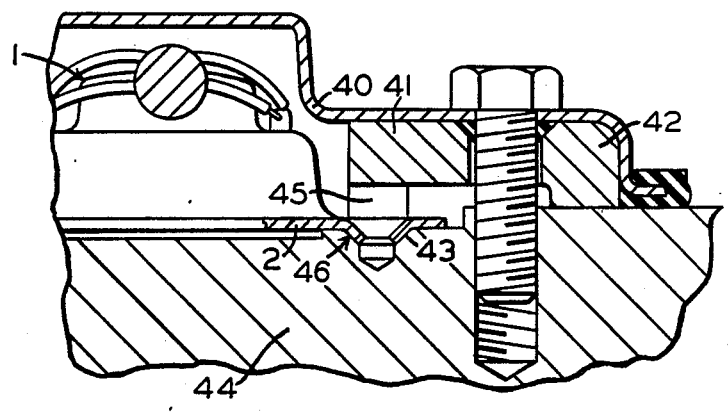

FIG. 5 also shows an embodiment for a fastening of the deformation sensor 1 with a two-piece screw support 40, 41. In this case, the sensor housing 2 ends outside the cap screw, and is not penetrated by the latter.

The first support part is again designed as a hood (identified in this case as 40) and in addition to the deformation sensor 1, encloses the second support part designed as a thrust piece 41. The thrust piece 41 is penetrated by the cap screw, but it is not concentric with the latter, and is supported on both sides of it on the axle housing 44. With its one side, the thrust piece 41 covers the contact area 46 of the sensor housing 2. On this side, the support of the thrust piece 41 is achieved by means of a conical collar which is connected with the thrust piece. The collar represents an area designed as a die, and forms, in cooperation with a recess 43 in the axle housing 44 complementary to its cone, the embossing-die contour; between which, the contact area 46 is braced and deformed under the action of the thrust piece 41 when the cap screw is tightened.

On its other side, the support of the thrust piece 41 is provided by a molded support point 42 that rests directly on the axle housing 44.

It is apparent that in this embodiment, the sensor housing 2 can also be extended to lie below the support point 42; whereby, in this case, the thrust piece would also be supported at this point by means of the sensor housing resting on the axle housing 44.

In this case, the sensor housing would also be penetrated (as in the other embodiments) by the cap screw.

Otherwise, the remarks concerning the embodiment illustrated in FIG. 4 apply, as appropriate, to the embodiment illustrated in FIG. 5.

The remarks concerning the previous embodiments also apply, as appropriate, to the embodiments illustrated in FIGS. 4 and 5.

It is apparent that, with the embodiments described above, the range of application of the present invention has not been exhaustively described. In particular, the invention can be advantageously realized (as described above) with hex head screws, but also with any other type of cap screws, e. g., flathead screws.

The invention can also be realized so that, instead of (as in the preceding embodiments) the deformable component being designed as a counter-die and the torsion member as a die, the deformable component serves as the die and the torsion member as the counter-die.

I claim:

1. A fastener arrangement for clamping a first member to a second member, particularly a sensor element to a member whose deformation is to be monitored, said sensor element being clamped to said deformation member at at least one screw-down point by at least one screw comprising:
   (a) a support portion of said sensor element resting on said deformation member in at least one contact area thereof;
   (b) a torsion member between said at least one screw and said sensor support portion;
   (c) said deformation member and said torsion member having complementary die and counter-die formations between which, said support portion is pressed into a shape conforming to said die and counter-die formations, during tightening of said at least one screw, to provide in said at least one contact area, a form-fit connection between said sensor support portion and said deformation member; and
   (d) said torsion member comprising means for isolating said sensor support portion from turning moments imparted by said at least one screw during said tightening thereof.

2. A fastener arrangement, as recited in claim 1, wherein said die and counter-die formations are conical in shape.

3. A fastener arrangement, as recited in claim 2, wherein two screw-down points are provided, at which said sensor element is clamped to said deformation member by said at least one screw at each said screw-down point, said sensor element lying in a plane passing through said two screw-down points.

4. A fastener arrangement, as recited in claim 3, wherein said conical shape of said sensor support portion in said at least one contact area includes slits along said plane passing through said two screw-down points.

5. A fastener arrangement, as recited in claim 1, wherein said die and counter-die formations are cylindrical in shape.

6. A fastener arrangement, as recited in claim 1, wherein said torsion member and said sensor support portion are each provided with an opening coaxial with said die and counter-die formations, and said deformation member is provided with at least one threaded opening at said screw-down point to receive said at least one screw passing through said openings in said torsion member and said sensor support member.

7. A fastener arrangement, as recited in claim 6, wherein said torsion member comprises:
   (a) a bonnet covering said sensor element in spaced-apart relationship with said sensor support portion, the periphery of said bonnet resting on said deformation member; and
   (b) at least one thrust piece interposed in the space between said bonnet and said deformation member, with one end of said thrust piece having engagement with the underside of said bonnet and the opposite end formed to provide one of said die and counter-die formations, said bonnet and said thrust portion having coaxial openings providing said opening in said torsion member via which said at least one screw passes.

8. A fastener arrangement, as recited in claim 7, wherein said isolating means comprises:
   (a) two screw-down points at which said sensor element is clamped to said deformation member by said at least one screw at each said screw-down point; and
   (b) said bonnet being continuous between said screws so as to be nonrotatable during tightening of said screws.

9. A fastener arrangement, as recited in claim 6, wherein said isolating means comprises:
   (a) said deformation member having an opening offset from said at least one threaded opening;
   (b) said torsion member having a protuberance engaged in said offset opening to prevent rotation of said torsion member during tightening of said at least one screw.

10. A fastener arrangement, as recited in claim 6, wherein said isolating means comprises:
    (a) said deformation member having an upraised support stud with at least one lateral surface offset from said at least one screw; and
    (b) said torsion member having at least one arm bent over into contact with said at least one lateral surface to prevent rotation of said torsion member during tightening of said at least one screw.

11. A fastener arrangement, as recited in claim 1, wherein said torsion member is provided with an opening therethrough offset from said die and counter-die formations, and said deformation member is provided with at least one threaded opening coaxial with said opening in said torsion member to receive said at least one screw passing through said opening in said torsion member without penetrating said sensor support portion.

12. A fastener arrangement, as recited in claim 11, wherein said torsion member comprises:
(a) a bonnet covering said sensor element in spaced-apart relationship with said sensor support portion, the periphery of said bonnet resting on said deformation member; and
(b) at least one thrust piece interposed in the space between said bonnet and said deformation member, with one end of said thrust piece having engagement with the underside of said bonnet and the opposite end formed to provide one of said die and counter-die formations, said bonnet and said thrust portion having coaxial openings providing said opening in said torsion member via which said at least one screw passes.

13. A fastener arrangement for fastening a first member to a second member by at least one screw which is screw-threaded into said second member comprising:
(a) said first member being deformable in at least one contact area thereof with said second member;
(b) screw support means interposed between said screw and said first member so as to be nonrotatable for isolating from said first member the turning moments imparted by said at least one screw during tightening thereof;
(c) said second member and said screw support means having die and counter-die formations in their portions adjacent said at least one contact area; and
(d) said at least one contact area of said first member being pressed into a shape conforming to said die and counter-die formations during said tightening of said at least one screw, to provide in said at least one contact area a form-fit connection by which said first member is fastened to said second member.

14. A fastener arrangement, as recited in claim 13, wherein said die and counter-die formations are conical in shape.

15. A fastener arrangement, as recited in claim 14, wherein two screw-down points are provided, at which said first member is fastened to said second member by said at least one screw at each said screw-down point, said first member lying in a plane passing through said two screw-down points.

16. A fastener arrangement, as recited in claim 15, wherein said first member in said at least one contact area includes slits along said plane passing through said two screw-down points.

17. A fastener arrangement, as recited in claim 13, wherein said die and counter-die formations are cylindrical in shape.

18. A fastener arrangement, as recited in claim 13, wherein said screw support means and said first member are each provided with an opening coaxial with said die and counter-die formations, and said second member is provided with at least one threaded opening to receive said at least one screw passing through said openings in said screw support means and said first member.

19. A fastener arrangement, as recited in claim 18, wherein said screw support means comprises:
(a) a bonnet covering said first member in spaced-apart relationship with said at least one contact area of said first member, the periphery of said bonnet resting on said second member; and
(b) at least one thrust piece interposed in the space between said bonnet and said at least one contact area of said first member, with one end of said thrust piece having engagement with the underside of said bonnet and the oppostie end formed to provide one of said die and counter-die formations, said bonnet and said thrust portion having coaxial openings providing said opening in said screw support means via which said at least one screw passes.

20. A fastener arrangement, as recited in claim 19, further comprising:
(a) two screw-down points at which said first member is fastened to said second member by said at least one screw at each said screw-down point; and
(b) said bonnet being continuous between said screws so as to render said screw support means nonrotatable during tightening of said screws.

21. A fastener arrangement, as recited in claim 18, wherein:
(a) said second member includes an upraised support stud with at least one lateral surface offset from said at least one screw; and
(b) said screw support means having at least one arm bent over into contact with said at least one lateral surface to render said screw support means nonrotatable during tightening of said at least one screw.

22. A fastener arrangement, as recited in claim 13, wherein said screw support means is provided with an opening therethrough offset from said die and counter-die formations, and said second member is provided with at least one threaded opening coaxial with said opening in said screw support means to receive said at least one screw passing through said opening in said screw support means without penetrating said first member.

23. A fastener arrangement, as recited in claim 22, wherein said screw support means comprises:
(a) a bonnet covering said first member in spaced-apart relationship with said at least one contact area of said first member, the periphery of said bonnet on said second member; and
(b) at lesat one thrust piece interposed in the space between said bonnet and said at least one contact area of said first member, with one end of said thrust piece having engagement with the underside of said bonnet and the opposite end formed to provide one of said die and counter-die formations, said bonnet and said thrust portion having coaxial openings providing said opening in said screw support means via which said at least one screw passes.

24. A fastener arrangement, as recited in claim 23, wherein:
(a) said second member includes an opening offset from said at least one theaded opening; and
(b) said at least one thrust piece includes a protuberance engaged in said offset opening to render said screw support means nonrotatable during tightening of said at least one screw.

* * * * *

UNITED STATES PATENT OFFICE
CERTIFICATE OF CORRECTION

PATENT NO. : 4,677,857
DATED : July 7, 1987
INVENTOR(S) : Joachim Feldmann

It is certified that error appears in the above-identified patent and that said Letters Patent is hereby corrected as shown below:

Column 7, lines 38-39, delete "first member to a second member, particularly a"

Column 10, line 44, after "bonnet", insert --resting--

Signed and Sealed this

Ninth Day of May, 1989

Attest:

DONALD J. QUIGG

*Attesting Officer*  *Commissioner of Patents and Trademarks*